United States Patent [19]
Terry

[11] Patent Number: 5,967,724
[45] Date of Patent: *Oct. 19, 1999

[54] FASTENER ASSEMBLY

[76] Inventor: Sydney L. Terry, 47 Pine Ct., Grosse Pointe Farms, Mich. 48236

[ * ] Notice: This patent issued on a continued prosecution application filed under 37 CFR 1.53(d), and is subject to the twenty year patent term provisions of 35 U.S.C. 154(a)(2).

[21] Appl. No.: 08/893,736

[22] Filed: Jul. 11, 1997

Related U.S. Application Data

[63] Continuation of application No. 08/543,381, Oct. 16, 1995, abandoned, which is a continuation of application No. 08/091,232, Jul. 13, 1993, Pat. No. 5,474,409, which is a continuation-in-part of application No. 07/912,893, Jul. 13, 1992, abandoned.

[51] Int. Cl.$^6$ .............................. F16B 31/00; F16B 39/24
[52] U.S. Cl. .......................... 411/149; 411/135; 411/533; 411/535
[58] Field of Search ..................................... 411/134, 135, 411/144, 149, 132, 136, 137, 138, 332, 536, 535, 75, 79, 150, 155, 156, 538, 80, 955, 956, 533

[56] References Cited

U.S. PATENT DOCUMENTS

| | | | |
|---|---|---|---|
| Re. 33,827 | 2/1992 | Terry | 411/149 |
| 891,574 | 6/1908 | Swain | 411/144 |
| 1,139,819 | 5/1915 | Smith | 411/144 |
| 1,622,581 | 3/1927 | Gunkel | 411/138 |
| 1,746,978 | 2/1930 | Winkler | 411/536 |
| 1,966,780 | 7/1934 | Wyrick | 411/536 |
| 3,329,190 | 7/1967 | Oldenkott | 411/136 |
| 3,438,416 | 4/1969 | Thurston | 411/134 |
| 4,538,313 | 9/1985 | Frieberg | 441/149 X |

FOREIGN PATENT DOCUMENTS

| | | | |
|---|---|---|---|
| 661412 | 6/1938 | Germany | 411/149 |
| 2136077 | 9/1984 | United Kingdom | 411/149 |

*Primary Examiner*—Neill Wilson
*Attorney, Agent, or Firm*—Reising, Ethington, Barnes, Kisselle, Learman & McCulloch, P.C.

[57] ABSTRACT

A locking fastener in which coacting ramp surfaces are provided on a nut and washer assembly to generate wedging forces in response to backing off movement of the nut which urge the nut into tighter engagement with the associated bolt and the workpiece and in which a spring member disposed radially from the ramp surfaces is biased by the final relative tightening movement of the nut and washer so as to bias the ramp surfaces for movement in the direction to augment the locking action of the fastener. A torque control fastener is disclosed in which the gap between the adjacent ramp shoulders on the nut and washer is indicative of the torque and the damping force exerted by the fastener.

16 Claims, 9 Drawing Sheets

FASTENER ASSEMBLY

This application is a continuation application of application Ser. No. 08/543,381*, filed on Oct. 16, 1995 and entitled FASTENER ASSEMBLY, now abandoned which is a continuation of U.S. Ser. No. 08/091,232, filed Jul. 13, 1993, which matured into U.S. Pat. No. 5,474,409, granted Dec. 12, 1995, which is a continuation-in-part of U.S. Ser. No. 07/912,893, filed Jul. 13, 1992, now abandoned.

FIELD OF THE INVENTION

This invention relates to locking fasteners and more particularly to locking fasteners of the type employing coacting wedge ramps.

BACKGROUND OF THE INVENTION

Locking fasteners are available in which coacting wedge ramps operate to generate wedging forces as the associated nut tends to back off of the associated bolt and these wedging forces are arranged to urge the nut into tighter engagement with the associated bolt and workpiece. Whereas locking fasteners operating on these wedge ramp principles work very well in static demonstrations, they have not achieved any widespread commercial acceptance since the nuts associated with the fasteners have tended to back off under the high frequency vibratory loading typically encountered in a real life commercial environment. Applicant's Patent No. 4,708,555 discloses a wedge ramp locking fastener in which this backing off or loosening problem is addressed by the provision of spring means included in the fastener assembly and operative to elastically resist relative movement of the members defining the respective ramp surfaces to store energy in the spring means biasing the elements of the fastener for movement in an opposite, loosening direction to increase the locking action so that the spring means and the wedge ramp surfaces coact on a continuing basis to cause tighter clamping if the threads and wedge ramp surfaces move in a loosening direction. Whereas the locking fastener of this patent is effective in eliminating the tendency of the fastener to back off under high frequency vibratory loading, the disclosed spring means constructions are somewhat complex and add considerably to the cost of the fastener assembly. In one of these constructions, the spring member is disposed in the gap between opposing shoulder of the wedge ramps and obstructs the space therebetween preventing the gap from being closed. In another construction, the one-piece spring washer does not provide the needed spring flexibility in the torsional direction.

SUMMARY OF THE INVENTION

This invention is directed to the provision of an improved locking fastener which is effective to preclude loosening of the associated nut even under high frequency vibratory load conditions and which is capable of indicating the torque load and the resulting clamping force on the fastener. In accordance with the invention, the desired torsional flexibility can be easily varied independent of the desired wedge contact area.

More specifically, this invention is directed to the provision of an improved means of providing a spring biasing action in a wedge cam locking fastener.

The inventive fastener is of the type including a first annular member, a second annular member and confronting coacting parallel first and second ramp surfaces with axially extending oppositely disposed ramp shoulders having a gap therebetween and held apart rotationally by a torsionally acting spring. The ramp surfaces, although held apart rotationally by the torsion spring, are movable into sliding wedging contact with each other in response to relative movement between the annular members in a first tightening direction to cause the first ramp surfaces to move slidably down the second ramp surfaces to decrease the overall axial height of the fastener and operative in response to relative movement between the annular members in the opposite loosening direction to cause the first ramp surfaces to move slidably up the second ramp surfaces to increase the overall height.

According to the invention, the fastener includes a spring member which urges the annular members in opposite rotative directions and is disposed externally of the gap, i.e. away from the gap so that the space between the shoulder is free of obstruction by the spring member. The spring member elastically resists relative movement of the annular members in the first tightening direction and is operative in response to such tightening movement to store energy biasing the annular members for movement in the opposite loosening direction to urge the first ramp surface to move slidably up the second ramp surface to increase the overall height of the fastener. This arrangement provides a simple and effective means of providing a spring force to drive the opposed wedge ramp surfaces in opposite rotational directions to increase the locking action so that the spring elements and the wedge surfaces coact on a continuing basis to preclude loosening of the joint.

According to a further feature of the invention, the spring member is integral with at least one of the first and second annular members. This specific arrangement facilitates the inexpensive manufacture of the fastener.

According to a further feature of the invention, the first annular member includes a main body annular portion, the first ramp surfaces are defined on the main body annular portion, and the spring member comprises a spring finger integral with the main body annular portion and positioned radially outwardly of the main body annular portion. This specific construction allows the spring member to be readily formed as an integral part of the first annular member.

According to a further feature of the invention, one end of the spring finger is integral with the main body portion and the other end of the spring finger is arranged to be elastically deflected in response to relative movement between the members. This arrangement provides an efficient means of storing energy in response to relative movement of the members.

According to a further feature of this invention, the second annular member includes an annular lower face and a peripheral side wall, the second ramp surfaces are defined on the lower face, and the spring finger of the first annular member engages the peripheral side wall of the second annular member. This arrangement further facilitates the spring loading of the assembly in response to relative movement between the annular members.

According to a further feature of the invention, the peripheral side wall of the second annular member includes a plurality of flat surfaces, and the first annular member includes a plurality of circumferentially spaced spring fingers positioned radially outwardly of the main body portion and respectively engaging the flat surfaces on the second annular member. This arrangement allows a spring force to be exerted against the second annular member at circumferentially spaced locations about the second annular member.

In several disclosed embodiments of the invention spring fingers extend directly radially outwardly from the main body annular portion; in another disclosed embodiment spring fingers extend in a circumferential direction relative to the annular main body portion; in another disclosed embodiment the fastener is formed as a one-piece fastener, advantageously plastic for manufacturing purposes, and includes first and second annular portions defining respectively coacting ramp surfaces and a plurality of band portions each connected at one end with the first annular member and connected at its other end with the second annular member; in another disclosed embodiment the spring member comprises a bushing positioned concentrically within the ramp surfaces; in another disclosed embodiment the spring member comprises an annular member positioned in surrounding relation to the ramp surfaces; and in another embodiment the spring member comprises a split ring type of torsion spring positioned concentrically within the ramp surfaces.

DETAILED DESCRIPTION OF THE PREFERRED EMBODIMENTS

First Embodiment

The invention locking fastener embodiment seen in FIGS. 1 through 5 includes a nut 10 and a washer 12.

Figure 2:
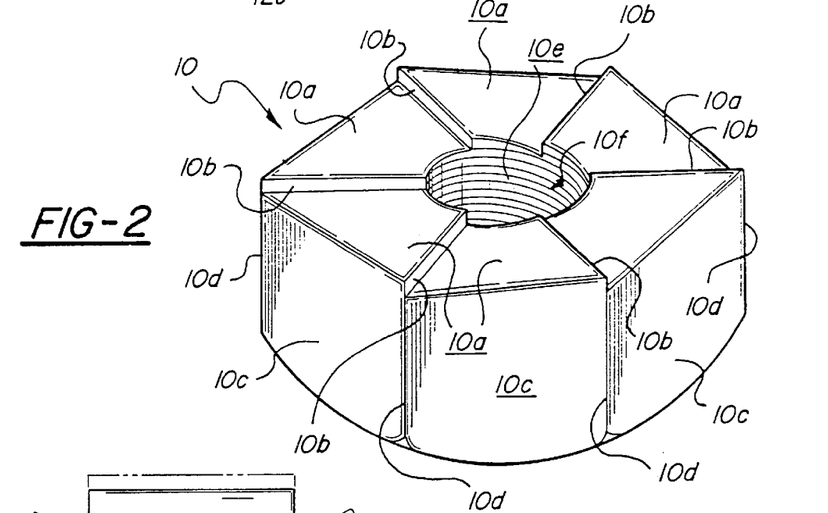
FIG. 2 is a perspective view of a nut employed in the invention fastener assembly.

Nut 10 is of standard hexagonal form except that the lower annular face of the nut is configured to define a plurality of flat ramp surfaces 10a each separated from the next adjacent ramp surface by a radially extending shoulder 10b. Preferably six ramp surfaces are provided with each ramp surface being coextensive with a respective flat side 10c of the nut so that each shoulder 10b at its radially outer extent is in respective alignment with a corner 10d defined between adjacent flats 10c. Ramp surfaces 10a are inclined relative to the horizontal in known manner by an angle or lead that is greater than the thread angle or lead of the threads 10e provided on the internal surface of the circular central aperture 10f of the nut. For example, if nut comprises a ⅜" thread diameter nut having threads with a lead of 1/16" (16 pitch) the lead of the ramp surfaces may be ⅛" (8 pitch).

Figure 1:
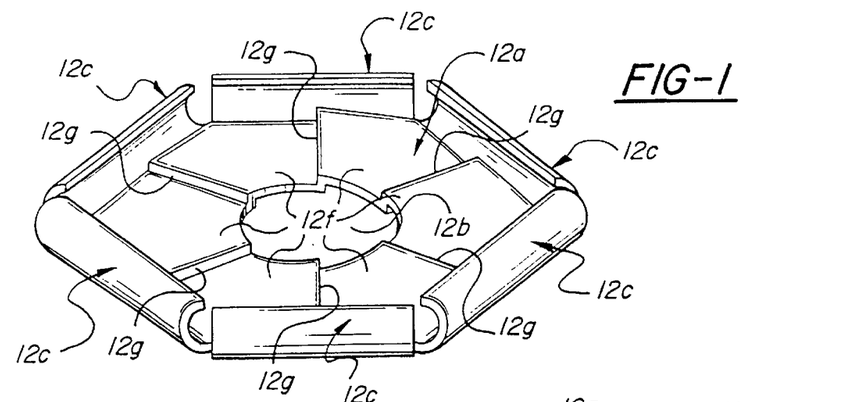
FIG. 1 is a perspective view of a washer employed in the invention fastener assembly.

Washer 12 is formed in a multiple stamping operation from sheet metal stock. Washer 12 includes an annular main body portion 12a surrounding a central aperture 12b, having a diameter corresponding generally to the diameter of the central aperture 10f of the nut 10, and a plurality of radially outwardly disposed and circumferentially spaced spring fingers 12c. In the preferred embodiment the outer periphery of annular portion 12a has a hexagonal configuration conforming generally to the hexagonal configuration of nut 10 and each spring finger 12e is substantially coextensive with a respective hexagonal side of the annular main body portion 12a. A series of flat ramps or wedge cam surfaces 12f are provided on the upper face of annular main body portion 12a with adjacent ramps separated by radially and axially extending shoulders 12g. Ramps 12f correspond in number and circumferential angle to the ramps 10a provided on the annular lower face of nut 10. For convenience, each of the shoulders 12g is disposed in a circumferential location such that it intercepts the mid-point of the hexagonal side of the washer, which provides a no-load gap of thirty degrees for the sixty degrees ramps. The ramps are adapted to coact in known manner in response to relative rotation between the washer and the nut to vary the overall height of the washer and nut assembly as the coacting ramp surfaces ride up and down on each other in wedging fashion. Any ramp motion that decreases the height of the washers loads the torsion spring, the more the gap decreases from the thirty degrees no-load position, the greater the torsion load is in the spring.

Each spring finger 12c of washer 12 has a U-shaped configuration in cross-section, is integral at its radially inner edge with main body annular portion 12a, and extends outwardly in cantilever, upwardly curving fashion from main body 12a to terminate in a free end edge 12h. Main body annular portion 12a preferably has a dished conical configuration, as best seen in FIG. 4, so that the lower face 12i of the main body portion, in the relaxed configuration of the washer, has a concave configuration.

Figure 3:
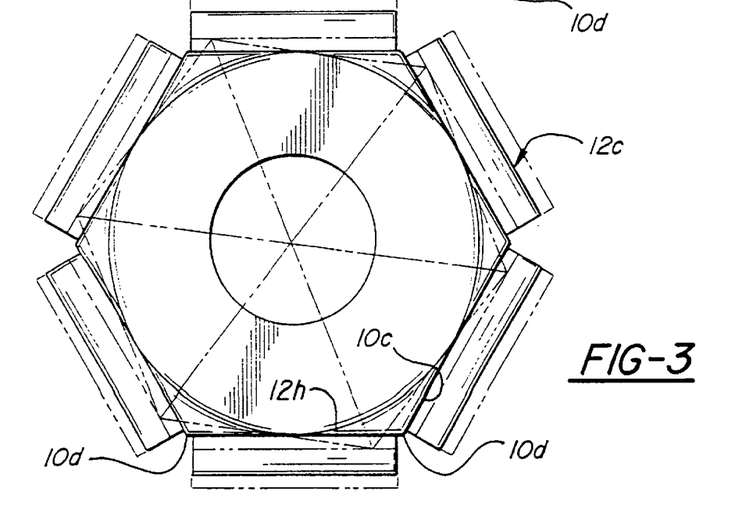
FIG. 3 is a top view of the nut and washer in their assembled relation.
Figures 4, 5:
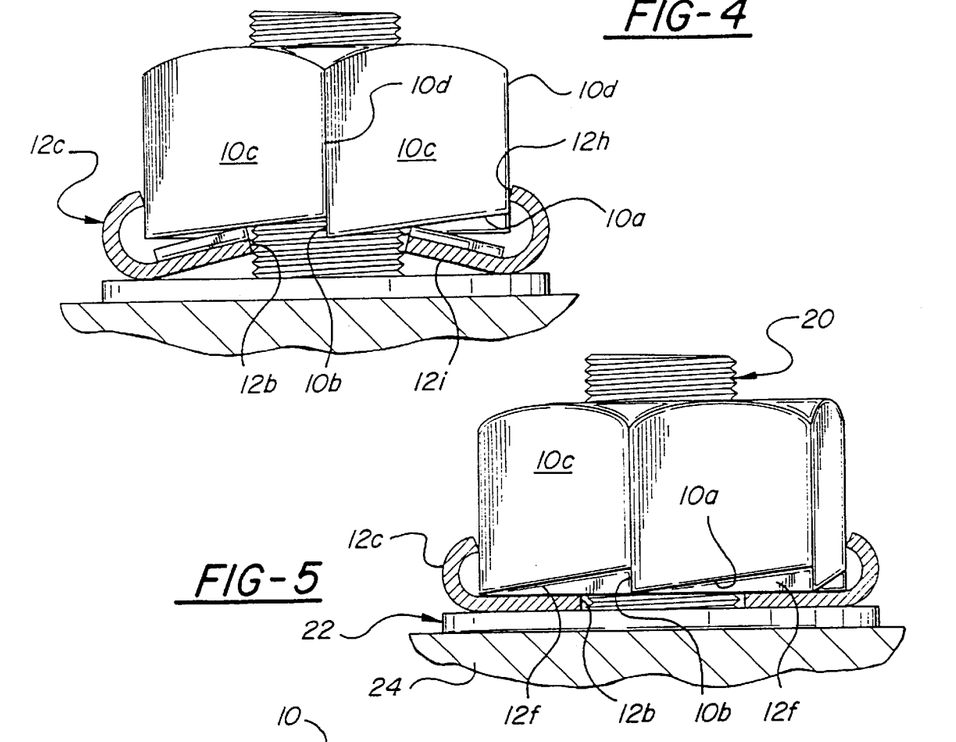
FIG. 4 is a side view the nut and washer in their assembled relation prior to final tightening of the fastener assembly.
FIG. 5 shows the nut and washer assembly of FIG. 4 in its final tightened configuration.

The assembled relation of the nut and washer prior to final tightening is seen in FIG. 4 and in solid lines in FIG. 3. In this assembled relation, prior to final tightening, the end edges 12h of the spring fingers 12c engage the respective flats 10c of the nut with a force sufficient to maintain the washer and nut in an assembled relation with the fingers 12c splayed outwardly slightly from their relaxed configuration to provide the necessary gripping action between the washer and the nut to preclude inadvertent separation of the nut and washer. The tightened configuration of the nut and washer, after final tightening, is seen in FIG. 5 and in dotted lines in FIG. 3.

Specifically, as the nut and washer are threaded downwardly on an associated bolt 20 so as to, for example, clamp a member 22 against a surface 24 from which the bolt 20 extends upwardly, the nut and washer move rotationally together as the nut threads downwardly on the bolt until a position is reached in which the lower face of the washer contacts the surface of member 22 and is restrained by friction thereof whereafter continuing tightening movement of the nut tends to flatten the washer and, during the final portion of the tightening movement, causes the ramps 10a on the nut to slide downwardly on the ramps 12f on the washer as the relative rotational movement of the washer slows. Simultaneously, during the final, relative tightening movement between the nut and washer, the corner edges 10d of the nut move into engagement with the respective adjacent spring fingers 12c and bias the spring fingers radially outwardly so as to impart a spring load on the nut at the interface of each spring finger and the respective corner 10d having a component tending to rotate the nut in the loosening direction with respect to the washer and urge the nut ramp surfaces back up along the washer ramp surfaces. The spring fingers thus act constantly to urge the opposed ramp surfaces in opposite rotational directions to increase the locking action so that the spring elements and the ramp surfaces coact on a continuing basis to preclude loosening of the fastener assembly. The final relative tightening movement between the nut and washer may be on the order, for example, of five degrees. FIG. 5 shows a gap between the shoulders 10b and 12g after final tightening of the nut. However, in certain applications, it may be desirable to design the fastener so that the shoulders reach engagement when the nut is tightened to the specified torque.

Second Embodiment

Figures 6, 9:
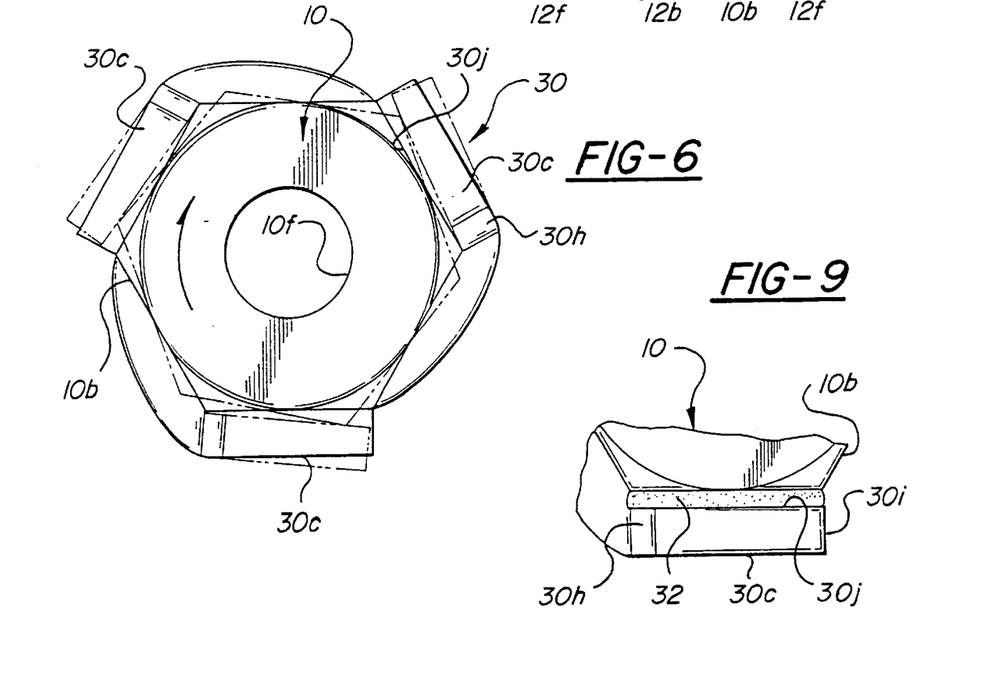
FIGS. 6 and 7 are top side views respectively of an alternative embodiment of the invention fastener assembly.
FIG. 9 is a fragmentary view showing a modification of the fastener assembly of FIGS. 6 through 8.
Figure 7:
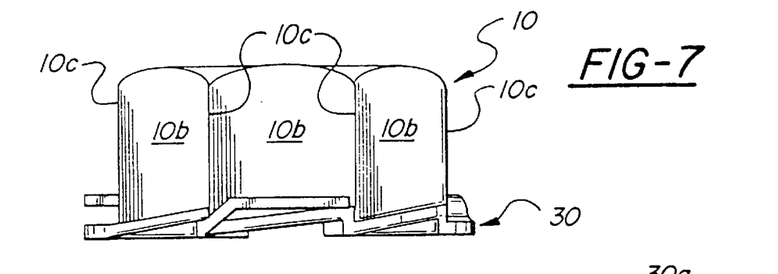
Figure 8:
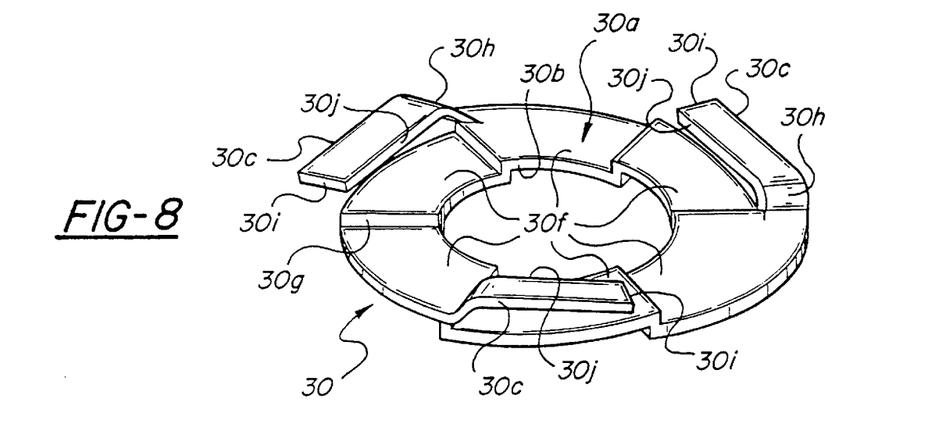
FIG. 8 is a perspective view of a washer employed in the fastener assembly of FIGS. 6 and 7.
Figures 10, 11:
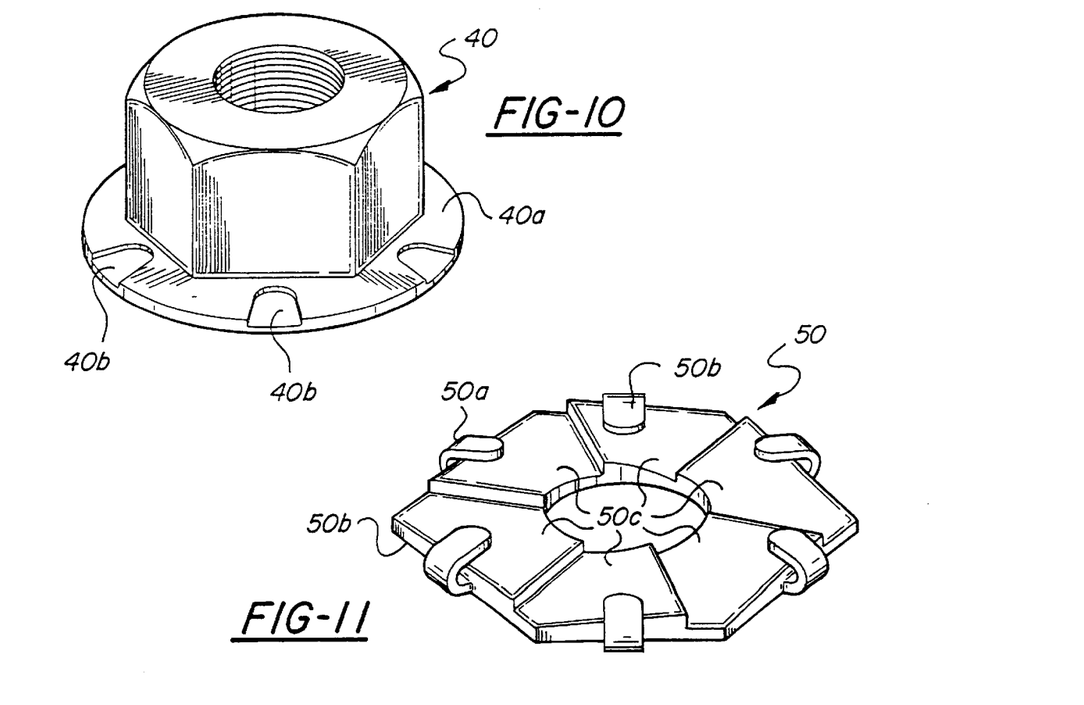
FIGS. 10 through 14 illustrate a further alternate embodiment of the invention fastener assembly.

The embodiment of the invention seen in FIGS. 6, 7 and 8 is generally similar to the embodiment seen in FIGS. 1 through 5 with the exception that the washer 30, rather than including a plurality of directly radially outwardly extending finger portions 12c, includes a plurality of circumferentially extending finger portions 30c which are disposed radially outwardly of the annular main body portion 30a, are joined to the annular main body portion at ends 30h, and extend circumferentially therefrom in cantilever fashion to terminate in free end edges 30i. In the pretightened configuration of the washer and nut assembly, as seen in solid lines in FIG. 6, the respective nut flats 10b are engaged by the radially inner edges 30j of the fingers 30c with a spring force sufficient to maintain the nut and washer in their assembled relation. As with the FIGS. 1 through 5 embodiment, and as seen by the dotted lines of FIG. 6, as the and washer approach the final tightening disposition and undergo relative rotation (for example, five degrees) so that the ramps 10a on the nut move downwardly on the ramps 30f on the washer, the corner edges 10d of the nut engage respective fingers 30c and bias the fingers radially outwardly to create a spring force acting constantly to drive the opposed ramp surfaces on the nut and washer in opposite rotational directions to increase the locking action so that the spring elements and the wedged ramp surfaces coact on a continuing basis to preclude loosening of the joint.

The modified form of the fastener assembly shown in FIG. 9 is identical to the embodiment of FIG. 6 through 8 with the exception that a member or substance 32 is secured or bonded to the radially inner edge 30j of each finger 30c and bears against the confronting respective flat 10b of the nut 10. The substance or member 32 is preferably resilient so as to augment the spring force exerted by the spring fingers against the flats of the nut and may also be adhesively bonded to the fingers and/or to the nut so as to facilitate maintaining the nut and washer in their assembled relation prior to use.

Third Embodiment

The alternate embodiment of the invention fastener assembly seen in FIGS. 10 through 14 is generally similar to the embodiment of FIGS. 1 through 5 except that the nut 40 comprises a flange nut including a lower circular flange portion 40a; the U-shaped spring fingers 50a of the annular washer 50, rather than being substantially coextensive with a respective hexagonal side 50b of the washer, are centered with respect to the respective hexagonal side and have a width comprising only a minor fraction of the length of the respective hexagonal side; and the free upper ends 50b of the spring fingers 50a are sized to fit nestingly and interlockingly in a respective plurality of circumferentially spaced notches 40b formed in the upper face of the flange 40a of the nut.

In use, the nut and washer move rotationally together as the nut threads downwardly on the associated bolt until a position is reached in which the lower face of the washer 50 contacts the support surface and is restrained by friction thereof whereafter continued tightening movement of the nut causes the ramps 40d on the lower face of the nut to slide downwardly on the ramps 50c on the upper face of the washer as the relative rotational movement of the washer slows. Simultaneously, during the final relative tightening movement between the nut and washer, the spring fingers 50a bend elastically and in cantilever fashion so as to impart a spring load on the nut to urge the opposed ramp surfaces in rotational directions to increase the locking action so that the spring fingers and the ramp surfaces coact on a continuing basis to preclude loosening of the fastener assembly. The notches 40b in the flange 40a of the nut preferably are somewhat oversized with respect to the corresponding dimensions of the fingers 50a to facilitate the twisting movement of the fingers as the nut and washer undergo their final relative rotation , as best seen by the solid and dashed line positions of the notch and finger seen in FIG. 13.

Fourth Embodiment

Figures 12, 13, 14, 15:
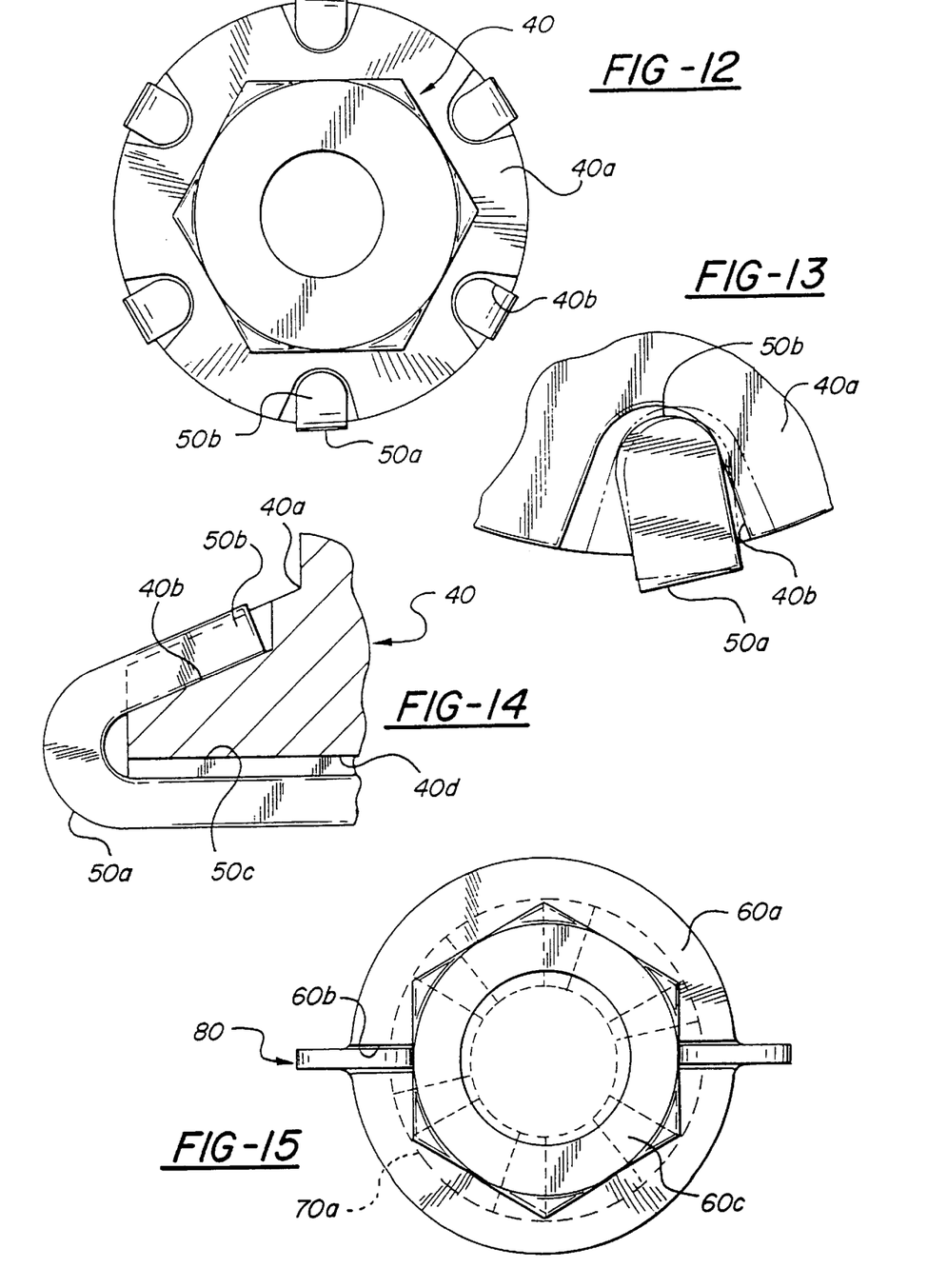
FIG. 15 and 16 illustrate a further alternate embodiment of the invention fastener assembly.
Figure 16:
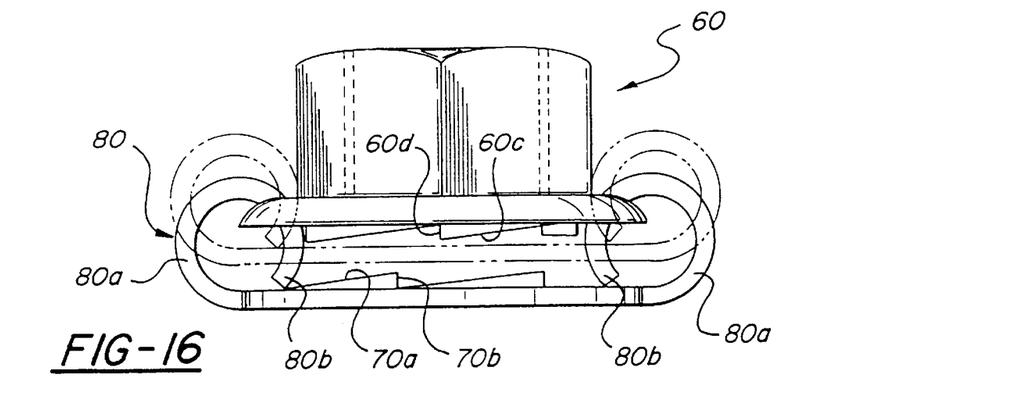

The alternate embodiment of the invention fastener assembly seen in FIGS. 15 and 16 is generally similar to the embodiment of FIGS. 10 through 14 except that the flange portion 60a of the nut 60 includes a pair of diametrically opposed slots or notches 60b extending completely through the flange portion and the washer 70 includes a pair of diametrically opposed spring fingers 80. Each finger 80 is formed integrally at one end 80a with the washer 70 and extends, in a smooth curvilinear fashion, radially outwardly from the washer, thence upwardly, thence radially inwardly, and thence downwardly again to define an inner or lower end 80b received in a respective notch 60b. The notches in the flange 60a are placed relative to the fingers 80 such that the ramp faces 70a on the upper face of the washer lead the ramp faces 60c on the lower face of the nut by approximately ten degrees so that, in use, the nut and washer move rotationally together as the nut is threaded downwardly on the associated bolt until a position is reached in which the lower face of the washer contacts the support surface and is restrained by friction thereof whereafter continued tightening movement of the nut causes the ramps 60c on the lower face of the nut to slide downwardly on the ramp 70a on the upper face of the washer until the ten degrees lead between the faces is taken up and the shoulders 70b and 60d abuttingly engage. During this ten degrees of relative rotation between the nut and washer the spring fingers 80 are bent elastically and in cantilever fashion so as to impart a spring load on the nut to urge the opposed ramp surfaces in rotational directions to increase the locking action so that the spring fingers and the ramp surfaces coact on a continuing basis to preclude loosening of the fastener assembly. The arrangement of the FIGS. 15,16 embodiment whereby only a limited amount (for example ten degrees) of relative rotational movement is allowed between the nut and the washer during the final relative tightening movement of the fastener allows very accurate control of the maximum spring load generated by the tightened fastener. Specifically, the spring load in the fastener, and thereby the tension in the associated bolt, may be precisely determined by precise and selective control of the lead angle between the washer ramp surfaces and the nut ramp surfaces and by selective variation of the torsional resistance generated by the fingers 80. The fastener may also be inspected for quality assurance by checking the angular position of the washer with respect to the nut. Specifically the gap between the shoulders on the nut and washer may be inspected at the time of initial tightening of the nut and washer to ensure that the elements have been properly tightened and inspection may also be performed after the fastener has been in service to ensure that the fastener continues to be satisfactorily tightened.

Fifth Embodiment

Figure 17:
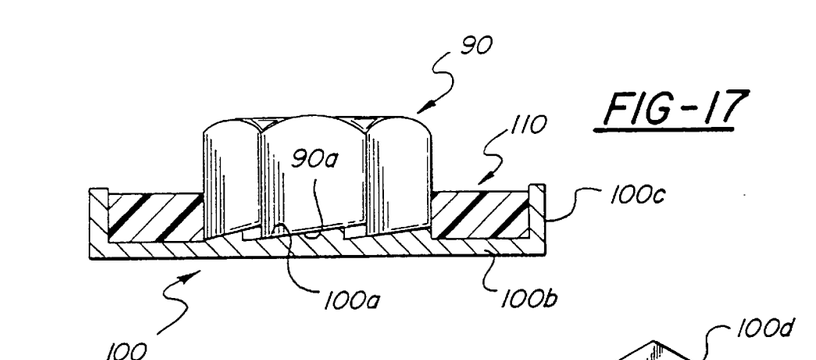
FIGS. 17 through 19 illustrate a further alternative embodiment of the invention fastener assembly.
Figure 18:
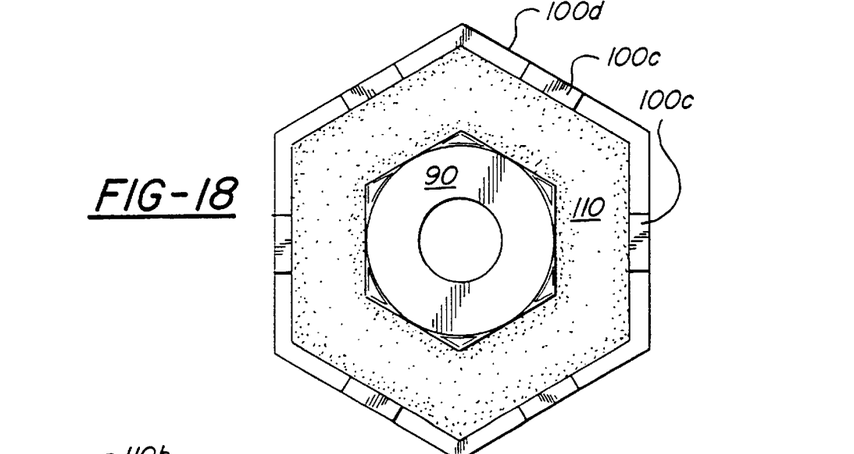
Figure 19:
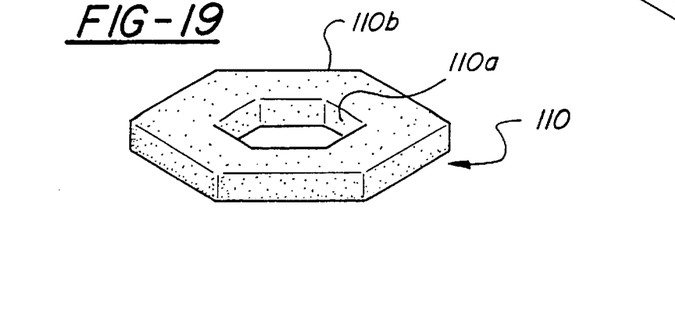
Figure 20:
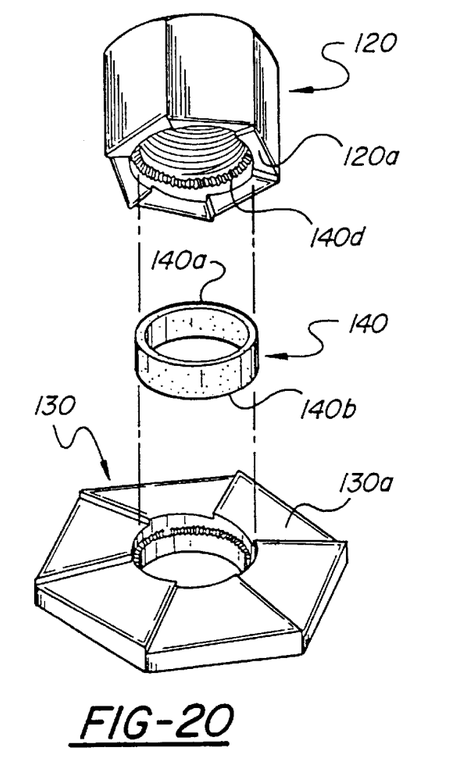
FIGS. 20 through 23 illustrate a further embodiment of the invention fastener assembly.
Figure 21:
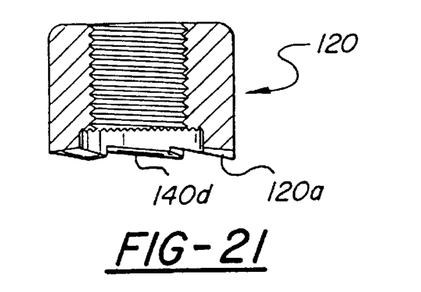
Figure 22:
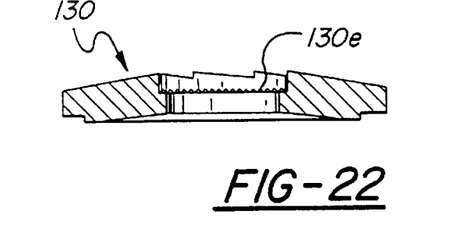
Figure 23:
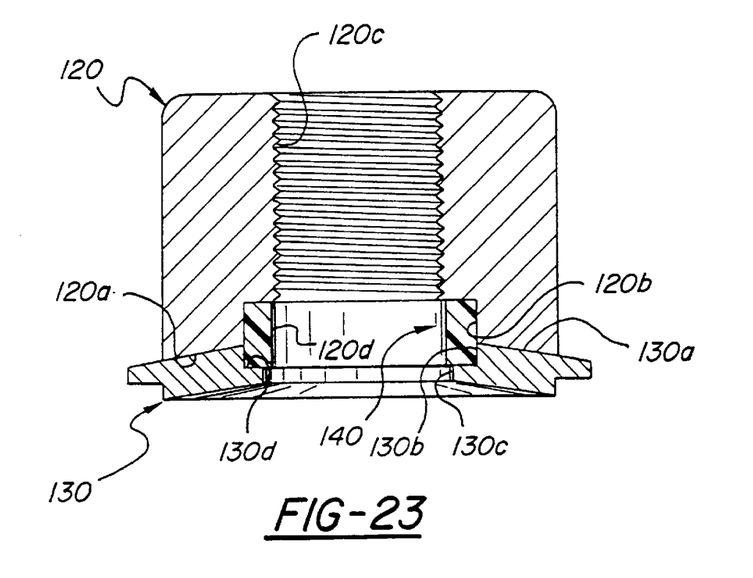

The alternative embodiment of the invention fastener assembly seen in FIGS. 17 through 19 includes a nut 90, a washer 100, and a spring member 110. Nut 90 comprises a hexagonal nut with ramp surfaces 90a provided on the lower annular face of the nut. Washer 100 has a hexagonal configuration and includes ramp surfaces 10a on the upper face of the washer for wedging coaction with the ramp surfaces 90a on the lower face of the nut and further includes an annular portion 100b in surrounding relation to the ramp surfaces 100a and a plurality of circumferentially spaced upstanding lugs 100c with one lug positioned centrally with respect to each hexagonal side face 100d of the washer. Spring member 110 comprises an annular member formed of a suitable elastomeric material such as rubber and having an internal hexagonal configuration 110a sized to fit snugly over the hexagonal nut 90 and an external hexagonal configuration 110b sized to fit snugly with the upstanding lugs 100c. If desired, suitable adhesive may be utilized to secure the annular member 110 with respect to the washer or with respect to the nut.

In use, the nut and washer move rotationally together as the is threaded downwardly on the associated bolt until the lower face of the washer contacts the support surface whereafter continued tightening movement of the nut causes the ramps on the lower face of the nut to slide downwardly on the ramps on the upper face of the washer and, simultaneously, causes the annular member 110 to twist elastically so as to impart a spring load on the nut to urge the opposed ramp surfaces in rotational directions to increase the locking action so that the spring member 110 and the ramp surfaces coact on a continuing basis to preclude loosening of the fastener assembly.

Sixth Embodiment

The alternate embodiment of the invention fastener assembly seen in FIGS. 20 through 23 includes a nut 120, a washer 130, and a spring member 140. Nut 120 has a hexagonal configuration and includes ramp surfaces 120a on the lower annular face of the nut and a counter bore 120b positioned centrally within the ramp surfaces 120a and coacting with central threaded bore 120c to define an annular shoulder 120d.

Washer 130 has a hexagonal configuration and includes a plurality of ramp surfaces 130a on its upper face and a counter bore 130b positioned centrally within ramp surfaces 130a and coacting with the central bore 130c of the washer to define an annular shoulder 130b.

Spring member 140 comprises a bushing formed of a suitable elastomeric material such as rubber and sized to fit within counter bores 120b, 130b with its upper annular face 140a seated against annular nut shoulder 120d and its lower annular face 140b seated against annular washer shoulder 130d. Serrations 120e on nut shoulder 120d bitingly engage the upper annular face 140a of the bushing and serrations 130e on the washer shoulder 130d bitingly engage the lower annular face 140b of the bushing so that the upper annular face 140a of the bushing will follow the rotation of the nut and the lower annular face 140b of the bushing will follow the rotation of the washer and so that the bushing will undergo a twisting action in the event of relative rotation between the nut and washer.

In use, the nut and washer move rotationally together as the nut threads downwardly on the associated bolt until a position is reached in which the lower face of the washer contacts the support surface whereafter continued tightening movement of the nut causes the ramps 20a on the lower face of the nut to slide downwardly on the ramps 130a on the upper face of the washer as the rotational movement of the washer slows. Simultaneously, during the final relative tightening movement between the nut and washer, the spring bushing 140 is twisted torsionally as the upper annular face of the bushing attempts to follow the movement of the nut and the lower annular face of the bushing adheres to the stationary washer. The elastically twisted bushing imparts a spring load on the nut to urge the opposed ramp surfaces in rotational directions to increase the locking action so that the bushing and the ramp surfaces coact on a continuing basis to preclude loosening of the fastener assembly.

Seventh Embodiment

The alternate embodiment of the invention fastener assembly seen in FIGS. 24 through 28 illustrates the manner in which the features of the invention may be embodied in a one piece fastener formed, for example, of a suitable plastic material. The one piece fastener of FIGS. 24 through 28 includes an annular upper portion 150 in the form of a nut, an annular lower portion 160 in the form of a washer, and a plurality of flexible U-shaped bands 170 integrally interconnecting the washer 160 and nut 150 at circumferentially spaced locations. For example, two diametrically opposed bands 170 may be provided with each band joined integrally at one end 170a to the midpoint of a respective hexagonal side face 160a of the washer and the other end 170b joined integrally with the nut 150 proximate a corner edge 150a of the nut.

Figures 24, 25, 26:
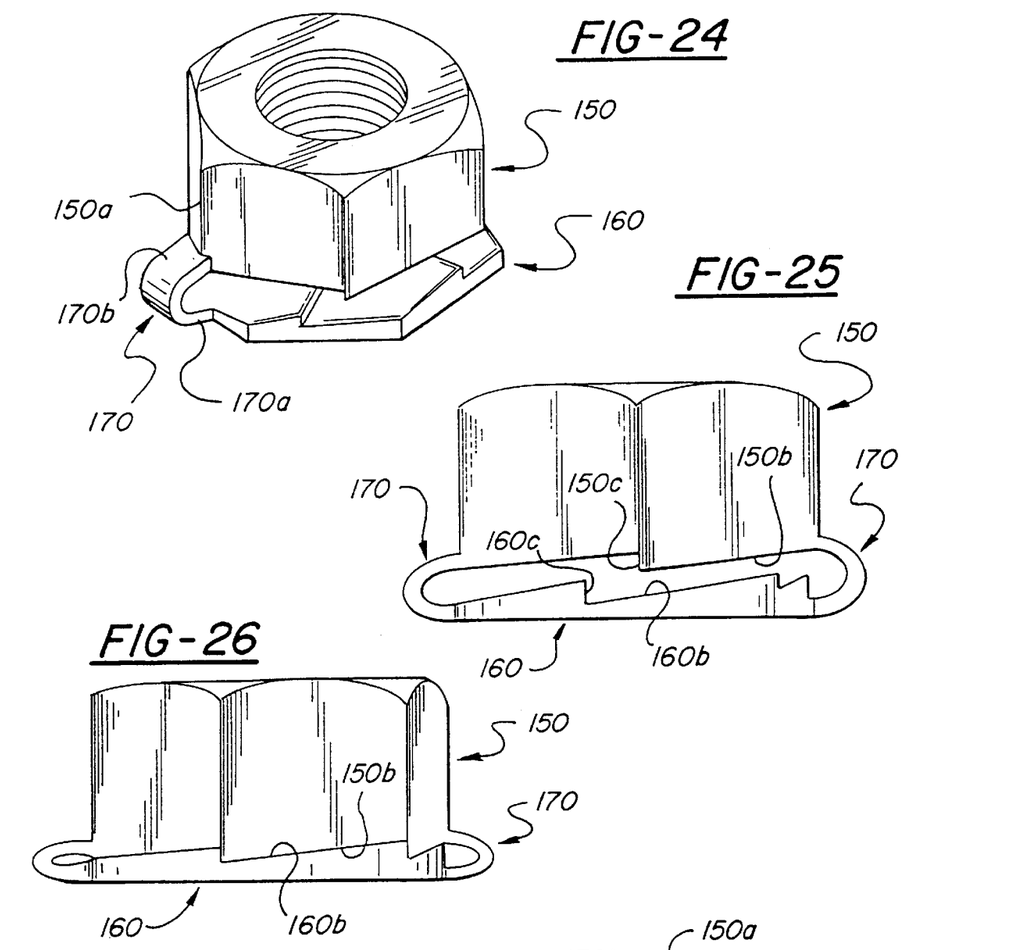
FIGS. 24 through 28 illustrate a further alternate embodiment of the invention fastener assembly.
Figure 27:
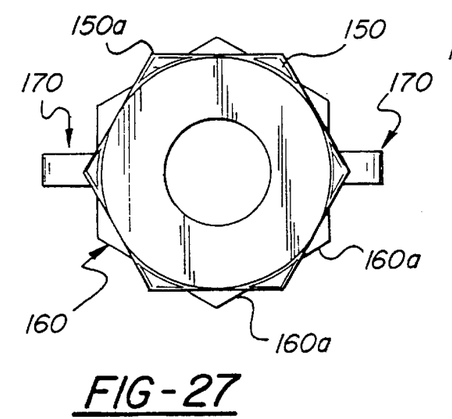
Figure 28:
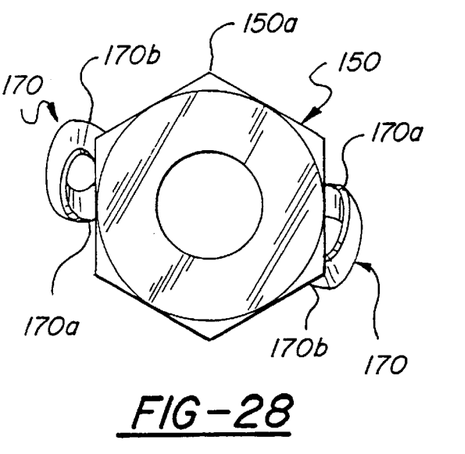

In use, the nut and washer portions move rotationally together as the nut threads downwardly on the associated bolt until a position is reached in which the lower face of the washer portion 160 contacts the support surface whereafter continued tightening movement of the nut portion causes the ramps 150b on the lower face of the nut portion to slide downwardly on the ramps 160b on the upper face of the washer portion, as the rotational movement of the washer portion slows. Simultaneously, during the final relative tightening movement between the nut portion and the washer portion, the bands 170 twist elastically and in cantilever fashion and move from the at rest condition seen in FIG. 27 to the twisted, stressed condition seen in FIG. 28 where the bands 170 act to urge the nut portion ramp surfaces back up along the washer ramp surfaces. The bands thus act constantly to urge the opposed ramp surfaces in opposite rotational directions to increase the locking action so that the bands and the ramp surfaces coact on a continuing basis to preclude loosening of the fastener assembly. The spring load generated by the bands 170 can be accurately controlled by controlling the lead of the ramp surfaces 160b on the washer relative to the ramp surfaces 150b on the nut and by controlling the torsional resistance generated by the bands 170. For example, as shown in FIG. 25, the washer ramp surfaces may lead the nut ramp surfaces in the relaxed configuration of the fastener by 20 degrees. During the final relative tightening movement of the nut and washer, the 20 degree lead is taken up when the shoulders 150*c* on the nut abut against the shoulders 160*c* on the washer to provide a predetermined maximum spring load urging the nut portion ramp surfaces back up along the washer ramp surfaces.

Eighth Embodiment

Figures 29, 30, 31:
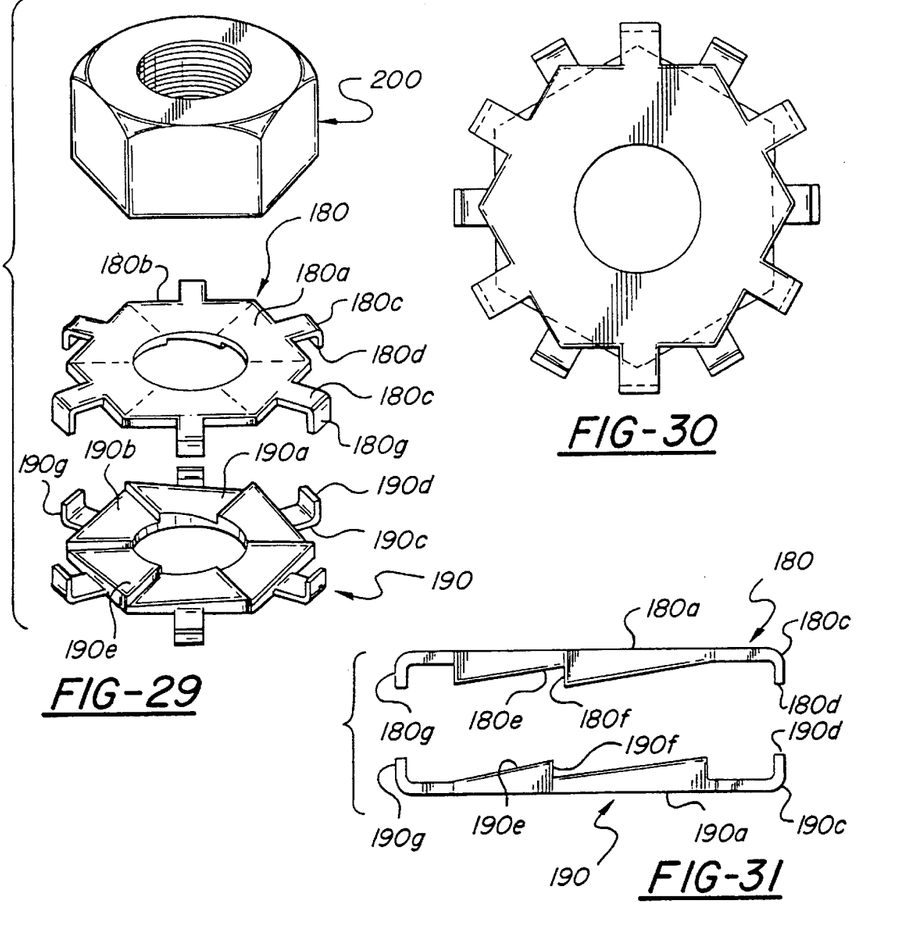
FIGS. 29 through 31 illustrate a still further alternate embodiment of the invention fastener assembly.

The alternate embodiment of the invention fastener assembly seen in FIGS. 29 through 31 illustrates the manner in which the features of the invention may be embodied in a fastener assembly including two washers coacting with a nut to form the fastener assembly.

The fastener assembly of the FIGS. 29 through 31 embodiment includes two identical washers 180 and 190 adapted for coaction with a standard hexagonal nut 200 to form a fastener assembly.

Washer 180 includes an annular main body portion 180*a* defining hexagonal side edges 180*b*, a spring finger 180*c* positioned centrally on each hexagonal side edge 180*b* and extending radially outwardly from the respective side edge and including a downturned end portion 180*d*, and a plurality of circumferentially spaced ramp surfaces 180*e* on the lower face of the main body portion 180*a*.

Similarly, washer 190 includes an annular main body portion 190*a* defining hexagonal side edges 190*b*, a spring finger 190*c* positioned centrally on each hexagonal side edge 190*b* and extending radially outwardly from the respective side edge and including an upturned end portion 190*d*, and a plurality of circumferentially spaced ramp surfaces 190*e* on the upper face of the washer. If desired, the upper and lower washers may be suitably but releasably joined together as, for example, by the use of a suitable cement.

As seen in FIG. 30, the upper and lower washers may be joined together with the fingers on the lower washer leading the fingers on the upper washer 30 degrees. The washers are configured such that, when superimposed one over the other, with their ramp surfaces in sliding engagement, the main bodies of the fingers 180*c* and 190*c* are vertically spaced from each other and may pass each other in a non-interfering manner but the downturned and upturned end portions 180*d*,190*d* occupy a common horizontal plane so that they will abut one another when the washers are moved rotationally relative to each other. With identical washers, the abutment of the fingers provides a lead angle between the ramps with a magnitude corresponding to the width of the fingers.

In use, the upturned washer 190 and downturned washer 180 are positioned over the associated bolt in the superimposed relation seen in FIG. 30. In this design, there is a high coefficient of friction between the nut and the upper washer and between the lower washer and the supporting surface relative to that between the ramp surfaces. Proper locking operation is fundamentally due to the spring action, but is encouraged and supported by low coefficients of friction between the wedge cams and higher friction coefficients between the opposite faces of the washer and their adjoining surfaces. The nut 200 is tightened downwardly on the bolt until the lower face of the nut contacts the upper face of the upper washer 180 whereafter continued rotation of the nut will move the upper washer rotationally relative to the lower washer to take up the lead as between the fingers of the lower washer and the fingers of the upper washer until the downturned ends 180*d* of the upper washer contact the respective upturned ends 190*d* of the lower washer whereafter continued tightening movement of the nut results in rotational movement of the upper washer relative to the lower washer against the spring force generated by the engaged respective fingers.

The washers are desirably dimensioned such that ramp shoulders 190*f* on the washer 190 move into abutting engagement with the ramp shoulders 180*f* on the upper washer 180 after a predetermined amount of interfering movement as between the upper and lower fingers. As the fingers move into interfering relationship with each other they bend and twist each other torsionally until the shoulders on the respective ramp surfaces abuttingly engage. The twisted and bent fingers act to urge the upper washer ramp surfaces back up along the lower washer ramp surfaces and thus act constantly to urge the opposed ramp surfaces in opposite rotational directions to increase the locking action so that the fingers and the ramp surfaces coact on a continuing basis to preclude loosening of the fastener assembly. Preferably, the finger end portions 180*d*,190*d* are dipped in rubber to cover the spring contact areas with a rubber coating 180*g*,190*g*. This rubber coating increases spring flexibility, divides the load more evenly between the spring fingers, reduces spring friction, provides system damping, and provides good bearing area.

The Fastener Torque Indicator

This invention provides a torque control fastener which provides an indication of the applied torque when the fastener is tightened and which also indicates the proportional residual or holding torque at anytime during use after the torquing tool has been removed. In the description of the fourth embodiment, which is shown in FIGS. 15 and 16, reference was made to inspection of the gap between the ramp shoulders on the nut and washer to check for proper tightening of the fastener. That feature of the invention, i.e. the fastener torque indicator will be described in greater detail.

Figure 32:
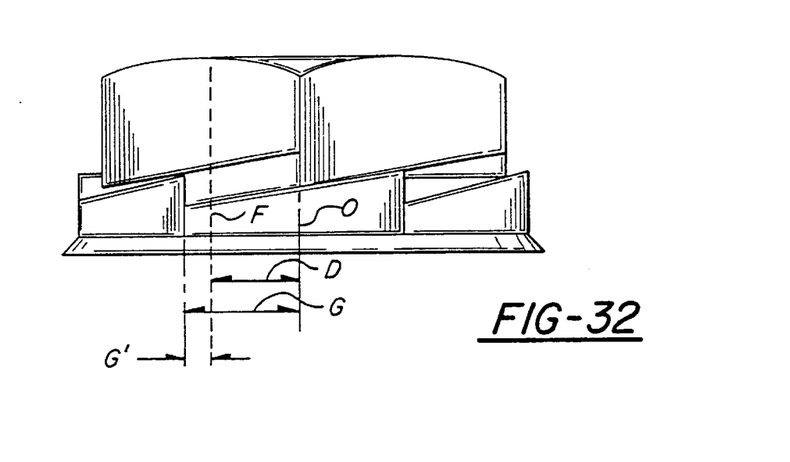
FIG. 32 is an elevation view of the engaging ramps of a nut and washer for use in describing the torque indicator of the invention.
Figure 33:
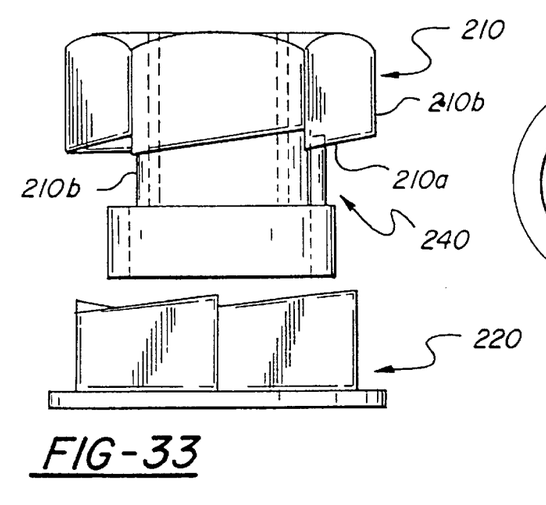
FIGS. 33 through 37 show a further alternate embodiment of the invention fastener assembly.
Figures 34, 37:
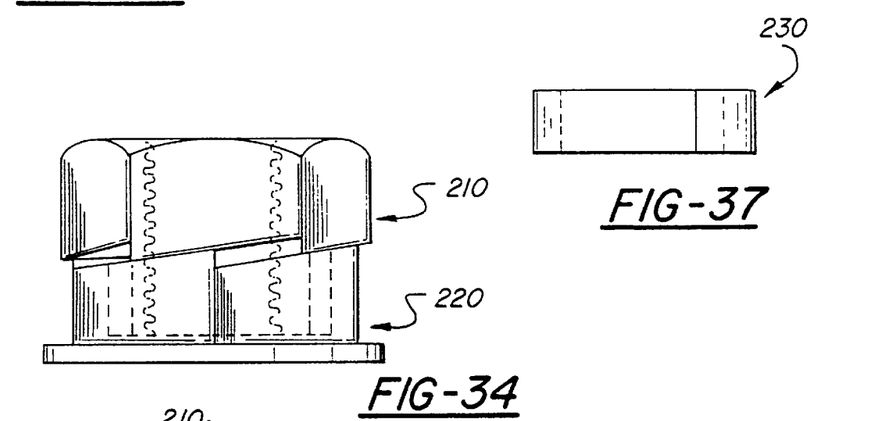
Figure 35:
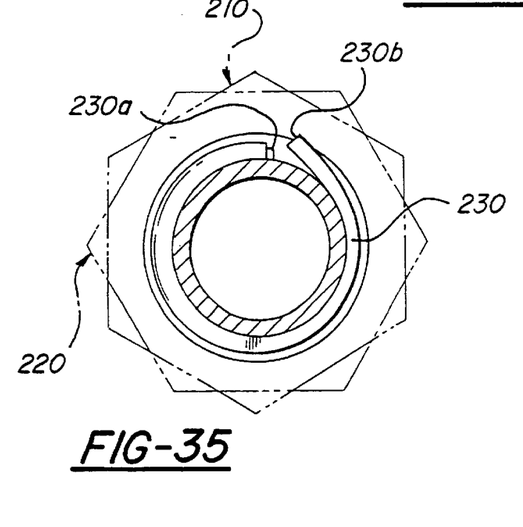
Figure 36:
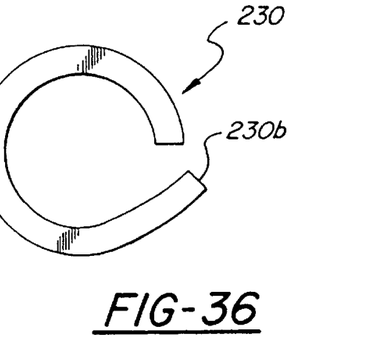

In use of the invention described above, during initial tightening, the nut and washer move rotationally together as the nut threads downwardly on the bolt until the lower face of the washer contacts the support surface. The nut and washer are held by the torsion spring during this initial tightening with a predetermined angular displacement or lead angle between a ramp shoulder on the washer and the corresponding ramp shoulder on the nut. This relationship is illustrated in FIG. 32. This lead angle provides an initial angular gap G between the shoulders which is maintained until the lower face of the washer contacts the support surface. When this occurs, the rotational movement of the washer is restrained by the frictional contact which increases until the rotation of the washer is stopped. The continued tightening rotation of the nut causes the ramps on the lower face of the nut to slide downwardly on the ramps on the upper face of the washer. Simultaneously during this final tightening the torsional spring of the fastener is displaced and deformed by the relative movement of the nut and the washer as the spring stores energy and develops a resilient reaction force corresponding to the spring displacement. When the nut is tightened to its fully tightened position, the gap G is decreased by an angle D. The angle D is proportional to the applied torque and is equal to the product of the angular displacement D and the spring rate, i.e. torque per unit of angular displacement. As shown in FIG. 32, each ramp shoulder on the nut is moved from its initial position O to its final position F during final tightening of the fastener. The angular displacement represented by the linear distance O to F along the hex faces of the nut and washer represents the final torque applied to the nut. The space between the positions O and F could, if desired, be calibrated with a scale representative of torque value.

In the arrangement described with reference to FIG. 32, there is a gap G' between the shoulders when the nut is in its final tightening position. It may be preferable in some applications to select the parameters in such manner that the gap between the shoulders is closed, i.e. reduced to zero, when final tightening to the desired or specified torque is achieved. This was explicitly described above in the Fourth, Seventh and Eighth Embodiments. This arrangement eliminates the possibility of over- tightening which may over stress the torsion spring of the fastener and impair or destroy its functional capability.

During tightening of the fastener, the applied torque may be observed by visual inspection of the gap between the ramp shoulders; more particularly, the maximum desired torque for a given fastener may be indicative when the ramp shoulder on the nut is aligned with the F position on the washer. After final tightening, with the fastener in use on its associated mechanism, the bolt tension may tend to change, depending upon the particular application. In the case of gasketed joints, the stack-up dimension of the clamped parts including the gasket may decrease with an attendant decrease in the bolt tension. In such case, the spring force exerted by the torsion spring of the fastener will urge the nut to rotate in the loosening direction relative to the washer and cause the ramp on the nut to slide upwardly on the ramp of washer thereby maintaining the tension in the bolt at a substantially constant value. Periodic visual inspection of the fastener will show whether this kind of change has occurred. For example, if the shoulder of the nut ramp has backed off from alignment with the F position on the washer ramp, a dimensional change in the stack-up of the parts is indicated. With this indication, it may be desired to retighten the nut so that the gap is reset to its initial value and the original factor of safety is restored.

All of the above-described Embodiments, except the Fifth Embodiment, are well adapted for use of the torque indicator. These constructions afford an elevation view of one or more coacting sets of wedge ramp surfaces and ramp shoulders. Index marks or calibration scales may be provided as desired on the appropriate hex head faces of the nut and washer. If the fastener is designed with an initial lead angle between the washer and nut ramp shoulders which will be decreased to zero by final tightening, i.e. zero gap between the shoulders, no index marks or calibration scales are necessary. The Ninth Embodiment, described below, is especially well suited for the torque indicator without index or calibration marks.

Ninth Embodiment

A further embodiment of this invention is shown in FIGS. 33 through 37. In this embodiment, a torsion spring is disposed in an annular space between the nut and the washer.

The nut 210 and washer 220 are formed of steel and are interconnected by a steel torsion spring 230. The nut 210 is a hex head nut having ramp surfaces 210a on the bottom face of the nut. The adjoining ramps are separated by ramp shoulders 210b which extend radially to the corners of the hex head nut. The washer 220 is also of hex configuration and is provided with ramps 220a and shoulders 220b on the upper face of the washer for coaction with the ramps 210a on the nut. The ramp shoulders on the washer intercept the respective flat face at its mid-point to provide a lead angle of thirty degrees. The nut 210 has a cylindrical extension or sleeve 240 which extends downwardly from the hex head into the washer. The through-hole of the washer at its lower end is tapered to a larger diameter and the sleeve is deformed outwardly to form an annular flange which retains the washer on the nut. This provides a limited axial movement between the nut and the washer and unlimited rotational movement therebetween. A self-locking nut of this construction is described in Ewing U.S. Pat. No. 5,190,423 granted Mar. 2, 1993 which is hereby incorporated by reference. The extension sleeve 240 is provided with a reduced diameter in an intermediate section 240b between the hex head 210 and the retaining section 240a. This provides an annular space between the inside diameter of the nut 220 and the outside diameter of the intermediate section 240b. This space accommodates the torsion spring 230 which has a split ring or C-shaped configuration. The spring 230, in its relaxed condition, is substantially circular from its inner end 230a throughout most of its circumference and the remainder is flared outwardly and terminates in end 230b. A tooth 240c on the outside diameter of the intermediate sleeve section 240b engages the inner end 230a of the spring and the outer end 230b of the spring is seated in a notch in the inside diameter of the washer 220. Thus, when the nut is tightened, the spring 230 is driven by the tooth on the sleeve of the nut and until the washer is firmly seated on the support surface, the nut and washer are driven rotatably together. When the washer is seated and restrained against further rotation, the torque load increases and the spring opens to a larger diameter which allows the gap between the ramp shoulders to close gradually to an amount indicative of the applied torque. At the full design torque load, the gap is fully closed and the ramp shoulders are in abutment. During the final tightening, the torsion spring 230 is deformed by circumferential enlargement and develops a reaction torque between the nut and the washer corresponding to the applied torque. An initial annular clearance, for example, 0.050 inches, is provided between the outside diameter of the circular portion of the spring and the inside diameter of the intermediate sleeve 240b. As the torque load increases, and the spring enlarges circumferentially, this clearance is decreased to a very small value when the full torque load is applied. It will be appreciated that the full torque load is a function of the cross-sectional area of the spring 230 for a given spring diameter.

Figure 38:
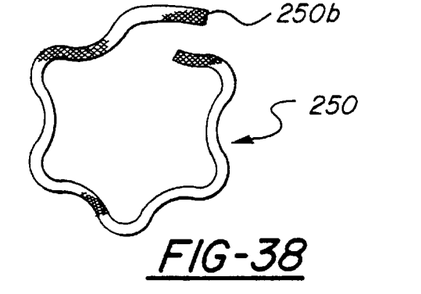
FIG. 38 shows a modification of the spring for this embodiment.

A modification of the torsion spring is shown in FIG. 38. In this modification, the torsion spring is a wave spring 250 of circular configuration. The spring, shown in plan view, has a width corresponding to the axial length of the intermediate sleeve portion 240b. The inner end 250a is seated against the tooth 240c on the inside diameter of the sleeve 240b. The outer end 250b is seated in a notch on the inside diameter of the washer, in the same manner as spring 230 described above. The wave spring 250 is designed for a desired degree of stiffness which decreases with cross-sectional area and an increasing number of waves in its configuration. The operation is the same as that described with reference to the 230. It will be appreciated that a wide range of torque values may be provided in a given nut and washer design by providing a set of split ring and/or wave springs of requisite stiffness.

The invention locking fasteners will be seen to provide an improved locking fastener assembly in which spring elements act constantly to drive the opposed ramp surfaces in opposite rotational directions to increase the locking action and in which the spring action is provided by a construction that is simple and inexpensive.

Whereas preferred embodiments of the invention have been illustrated and described in detail, it will be apparent that various changes may be made in the disclosed embodiments without departing from the scope or spirit of the invention.

I claim:

1. A locking device for use with a threaded fastener, said fastener comprising first and second fastener elements having female and male threads, respectively, for mating engagement with each other, said locking device comprising:

first and second washers each having an annular main body portion with confronting coacting generally parallel first and second ramp surfaces with axially extending oppositely disposed ramp shoulders having a gap therebetween, said first and second ramp surfaces being respectively inclined relative to the axis of the washers and movable into sliding wedging contact with each other in response to relative movement between said washers in a tightening direction to cause said first ramp surface to move slidably down said second ramp surface to decrease the overall axial height of the washers and operative in response to relative movement between said washers in a loosening direction to cause said first ramp surface to move slidably up said second ramp surface to increase said overall height, said first washer including at least one finger integral with the main body portion and positioned radially of the main body portion, and said second washer including at least one finger integral with the main body portion and positioned radially of the main body portion to engage the finger on the first washer in response to relative movement between the washers in the tightening direction, said fingers elastically resisting relative movement of said washers in said tightening direction, and operative in response to such tightening movement to store energy biasing the annular members for movement in said loosening direction to urge said first ramp surfaces to move slidably up said second ramp surfaces to increase the overall height of the fastener, one of said fastener elements being related to the first washer in such a manner that it imparts rotational movement to the first washer when said one fastener element is rotated in the tightening direction, the first and second ramp surfaces having a pitch for being different from the pitch of said threads whereby rotation of the first washer wedge member in the loosening direction causes the threads to jam.

2. A fastener according to claim 1 wherein said finder on each of said washers is positioned radially outwardly of said main-body portion.

3. An annular locking fastener comprising a first annular member, a second annular member, and confronting coacting parallel first and second ramp surfaces on said first and second annular members respectively inclined at a circumferential angle and movable into sliding wedging contact with each other in response to relative movement between said annular members in a first tightening direction to cause said first ramp surface to move slidably down said second ramp surface to decrease the overall axial height of the fastener and operative in response to relative movement between said annular members in the opposite loosening direction to cause said first ramp surface to move slidably up said second ramp surface to increase the overall height, characterized in that said fastener includes a spring member integral with at least one of said first and second annular members elastically resisting relative movement of said annular members in said first tightening direction and operative in response to such tightening movement to store energy biasing the annular members for movement in said opposite loosening direction to urge said first ramp surfaces to move slidably up said second ramp surfaces to increase the overall height of the fastener.

4. A locking device for use with a threaded fastener, said fastener comprising first and second fastener elements having female and male threads, respectively, for mating engagement with each other, said locking device comprising:

first and second washers each defining an axis and having an annular main body portion with confronting coacting generally parallel first and second ramp surfaces with axially extending oppositely disposed ramp shoulders having a gap therebetween, said first and second ramp surfaces being respectively inclined relative to the axis of the washers and movable into sliding wedging contact with each other in response to relative movement between said washers in a tightening direction to cause said first ramp surface to move slidably down said second ramp surface to decrease the overall axial height of the washers and operative in response to relative movement between said washers in a loosening direction to cause said first ramp surface to move slidably up said second ramp surface to increase said overall height, said first washer including at least one drive member integral with the main body portion and positioned radially of the main body portion, and said second washer including at least one driven member integral with the main body portion and positioned radially of the main body portion to engage the drive member on the first washer in response to relative movement between the washers in the tightening direction, one of said fastener elements being related to the first washer in such a manner that it imparts rotational movement to the first washer when said one fastener element is rotated in the tightening direction, the first and second ramp surfaces having a pitch for being different from the pitch of said threads whereby rotation of the first washer in the loosening direction causes the threads to jam.

5. A self-locking threaded fastener comprising:

first and second fastener elements having female and male threads defining an axis for mating engagement with each other, first and second face cams each having a body portion with a central opening, said face cams being disposed between said fastener elements and rotatable around said axis, said first and second face cams having confronting coacting generally parallel first and second ramp surfaces, respectively, with axially extending oppositely disposed ramp shoulders having a gap therebetween, said first and second ramp surfaces being respectively inclined relative to said axis and movable into sliding wedging contact with each other in response to relative movement between said face cams in a tightening direction to cause said first ramp surface to move slidably down said second ramp surface to decrease the overall axial height of the face cams and operative in response to relative movement between said face cams in the loosening direction to cause said first ramp surface to move slidably up said second ramp surface to increase the overall height, drive means having a lost motion connection operatively connected between said first and second face cams for imparting rotation from the first face cam to the second face cam in the tightening direction and loosening direction, said drive means being disposed away from said gap so that the space between said ramp shoulders is free from obstruction by said drive means, one of said fastener elements being related to said first face cam in such a manner that it imparts rotation to said first face cam when said one fastener element is rotated, said second face cam being adapted to engage a workpiece, said drive means being operative when said one of the fastener elements is rotated in the tightening direction to drive the first face cam in the tightening direction so that the ramp surface on the first face cam is moved into only partial overlapping contact with the confronting ramp surface on the second face cam when the rotation of the second face cam is stopped by frictional engagement with the workpiece, thereby allowing further tightening of the fastener without closing said gap between said ramp shoulders, said drive means being operative when said one of the fastener elements is rotated in the loosening direction to drive said second face cam with the first face cam in the loosening direction.

6. A self-locking threaded fastener as defined in claim 5 wherein said first and second ramp surfaces have a pitch different from the pitch of said threads whereby rotation of said first face cam in the loosening direction causes the threads to jam.

7. A self-locking threaded fastener as defined in claim 5 wherein said drive means includes an elastic member connected with at least one of said first and second face cams for elastically resisting relative movement of said fastener elements in said first tightening direction and operative in response to such tightening movement to store energy biasing the fastener elements for movement in said opposite loosening direction to urge said first ramp surfaces to move slidably up said second ramp surfaces to increase the overall height of the fastener.

8. A self-locking threaded fastener as defined in claim 5 wherein said drive means comprises a plurality of fingers connected with and positioned radially of the first face cam and a plurality of abutments on said second face cam for engaging said fingers in response to relative rotation of said first and second face cams.

9. A self-locking threaded fastener as defined in claim 8 wherein said first face cam comprises a spring finger integral with said first face cam and positioned radially outwardly of said first face cam.

10. A self-locking threaded fastener as defined in claim 9 wherein one end of said spring finger is integral with said first face cam and the other end of said spring finger is arranged to be elastically deflected in response to relative movement between said face cams.

11. A self-locking threaded fastener as defined in claim 10 wherein said other end of said spring finger engages a peripheral surface on said second face cam.

12. A self-locking threaded fastener as defined in claim 5 wherein said driving means comprises a first set of spring fingers integral with the first face cam and positioned radially outwardly thereof, a second set of spring fingers integral with the second face cam and positioned radially outwardly thereof, said first set of spring fingers being arranged to twistingly engage and bend the second set of spring fingers in response to relative movement between the face cams in the tightening direction.

13. A method of providing a fastener assembly having a predetermined torque loading comprising the steps of:

providing a first fastener element having a series of circumferentially spaced ramp surfaces separated by abutment surfaces;

providing a second fastener element having a series of circumferentially spaced ramp surfaces separated by abutment surfaces and movable slidably down the ramp surfaces on said first element in response to relative tightening movement between said elements;

providing spring means elastically resisting relative movement of said elements by a predetermined amount per increment of relative angular movement; and providing said fastener elements with a predetermined number of increments of angular spacing between the confronting abutment surfaces on said elements so that, when the elements are tightened to bring the abutment surfaces into engagement, the fastener embodies a predetermined torque loading comprising the product of said predetermined amount of resistance per increment and said predetermined number of increments.

14. A method of providing a fastener assembly having a predetermined torque loading comprising the steps of:

providing a first fastener element having a series of circumferentially spaced ramp surfaces separated by abutment surfaces;

providing a second fastener element having a series of circumferentially spaced ramp surfaces separated by abutment surfaces and movable slidably down the ramp surfaces on said first element in response to relative tightening movement between said elements;

providing spring means elastically resisting relative tightening movement of said elements;

tightening the elements to bring the abutment surfaces into proximity so that the fastener embodies torque loading; and visually inspecting the gap between the abutment surfaces to ensure compliance with predetermined standards.

15. A method as defined in claim 14 wherein:

the inspection is performed at the time of initial tightening of the elements to ensure that the elements have been properly tightened.

16. A method as defined in claim 14, wherein:

the inspection is performed after the fastener has been in service to ensure that the fastener continues to be satisfactorily tightened.

* * * * *